United States Patent
Giles et al.

(10) Patent No.: US 7,668,256 B2
(45) Date of Patent: Feb. 23, 2010

(54) METHOD AND APPARATUS FOR THE GENERATION AND DETECTION OF OPTICAL DIFFERENTIAL VARIED-MULTILEVEL PHASE-SHIFT KEYING WITH PULSE AMPLITUDE MODULATION (ODVMPSK/PAM) SIGNALS

(75) Inventors: Randy C Giles, Whippany, NJ (US); Xiang Liu, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 641 days.

(21) Appl. No.: 11/458,825

(22) Filed: Jul. 20, 2006

(65) Prior Publication Data

US 2008/0019460 A1 Jan. 24, 2008

(51) Int. Cl.
*H03C 1/52* (2006.01)
*H03K 7/02* (2006.01)
*H04L 27/18* (2006.01)

(52) U.S. Cl. ............... 375/300; 375/353; 332/115; 332/149; 398/188; 398/189

(58) Field of Classification Search ............ 375/268, 375/269, 279, 283, 300, 308, 320, 330, 353; 329/304, 347, 348, 363; 332/103, 115, 149; 455/108; 398/135, 138, 140, 156, 182, 183, 398/188, 189, 190, 191, 202
See application file for complete search history.

(56) References Cited

U.S. PATENT DOCUMENTS

2002/0159121 A1* 10/2002 Spickermann ............ 359/188
2003/0095311 A1  5/2003 Liu et al.
2004/0021829 A1  2/2004 Griffin
2004/0101060 A1* 5/2004 Simon et al. ............ 375/242
2005/0069330 A1  3/2005 Kao et al.
2007/0009264 A1* 1/2007 Kamio et al. ............ 398/102
2007/0009269 A1  1/2007 Zitelli
2007/0206960 A1* 9/2007 Nissov et al. ............ 398/188

FOREIGN PATENT DOCUMENTS

| EP | 1 519 499 B1 | 3/2005 |
| WO | 03/049333 A1 | 6/2003 |
| WO | 03/092237 A1 | 11/2003 |

OTHER PUBLICATIONS

C. Kim et al., Direct-detection optical differential 8-level phase-shift keying (OD8PSK) for spectrally efficient transmission, Optics Express vol. 12, No. 15, Jul. 26, 2004.
K. Sekine et al., Proposal and Demonstration of 10-Gsymbol/sec 16-ary (40 Gbit/s) Optical Modulation/Demodulation Scheme, ECOC '04, Paper We 3.4.5, 2004.
H. Yoon et al., Performance comparison of optical 8-ary differential phase-shift keying systems with different electrical decision schemes, Optics Express, Jan 24, 2005.

* cited by examiner

*Primary Examiner*—Young T. Tse
(74) *Attorney, Agent, or Firm*—Brosemer, Kolefas & Associates, LLC

(57) ABSTRACT

Methods and apparatus are described for generating and receiving amplitude and differential-phase encoded signals in which the number of phase states at a given amplitude level is always less than or equal to that at a higher amplitude level and at least two amplitude levels have different numbers of phase states.

30 Claims, 4 Drawing Sheets

METHOD AND APPARATUS FOR THE GENERATION AND DETECTION OF OPTICAL DIFFERENTIAL VARIED-MULTILEVEL PHASE-SHIFT KEYING WITH PULSE AMPLITUDE MODULATION (ODVMPSK/PAM) SIGNALS

FIELD OF THE INVENTION

The present invention relates to the field of high-speed optical communications, and more specifically to methods and apparatus for generating and detecting amplitude and differential-phase encoded signals with high spectral and power efficiency.

BACKGROUND INFORMATION

Optical modulation formats supporting the need for high spectral-efficiency optical communications with high receiver sensitivity are attractive to future free-space and terrestrial optical communications. Optical differential multi-level phase-shift keying (ODMPSK) is a modulation format type that has attained high spectral efficiency. An optical differential 8-level phase-shift keying (OD8PSK) format with 3 bits/symbol has been proposed. (See, e.g., C. Kim et al., "Direct-detection optical differential 8-level phase-shift keying (OD8PSK) for spectrally efficient transmission," Optics Express vol. 12, pp. 3415-3421, 2004). The combined use of ODMPSK and pulse amplitude modulation (PAM) has also been proposed to obtain high spectral efficiency. A 4-bit per symbol (or 16-state) modulation format based on differential quadrature-phase-shift keying (DQPSK) and a 4-level pulse amplitude modulation format (PAM) have been demonstrated. (See, e.g., K. Sekine et al., "Proposal And Demonstration Of 10-G symbol/sec, 16-ary (40 Gb/s) Optical Modulation/Demodulation Scheme," Proceedings of European Conference on Optical Communication (ECOC'04), paper We3.4.5, 2004). Unfortunately, theses types of modulation formats suffer from a number of drawbacks.

More specifically, a major drawback of these types of modulation formats is poor receiver sensitivity due to their inefficient symbol constellations. Generally speaking, the minimum distance among the symbols in a constellation diagram of a modulation format, for a given average signal power, is desired to be maximized in order for the signal to have high a immunity to noise. In addition, detection of ODMPSK and ODMPSK/PAM is very complex. For ODMPSK, highly stabilized optical demodulators are needed. Each demodulator is also required to be able to compensate for the change in relative phase between its interfering arms resulting from ambient temperature change or signal carrier frequency drift.

SUMMARY OF THE INVENTION

Multilevel phase and amplitude modulated signals having a superior constellation and which do not suffer from the deficiencies associated with known approaches are generated by methods and apparatus in accordance with the principles of the present invention such that each of a plurality of amplitude levels that are possible for the signal has a plurality of phase states, the number of phase states increasing with increasing amplitude level. In an exemplary embodiment of the present invention, a power-efficient multilevel phase and amplitude modulated signal is realized in which the number of the phase states assigned to a given amplitude level is roughly proportional to the magnitude of the amplitude, i.e., more phase states are assigned to larger amplitude levels. The modulation format is hereinafter referred to as Optical Differential Varied-Multilevel Phase-Shift Keying with Pulse Amplitude Modulation (ODVMPSK/PAM).

In a further aspect of the present invention, a scheme for receiving ODVMPSK/PAM signals is provided that is versatile and can be implemented in a simple manner.

DETAILED DESCRIPTION

The following description is intended to illustrate the principles of the present invention. It will thus be appreciated that those skilled in the art will be able to devise various arrangements that, although not explicitly described or shown herein, embody the principles of the invention and are included within the spirit and scope of the invention. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Unless otherwise explicitly specified herein, the drawings are not drawn to scale. In the description, identically numbered components within different ones of the drawings refer to the same components.

Figures 1A, 1B, 1C:
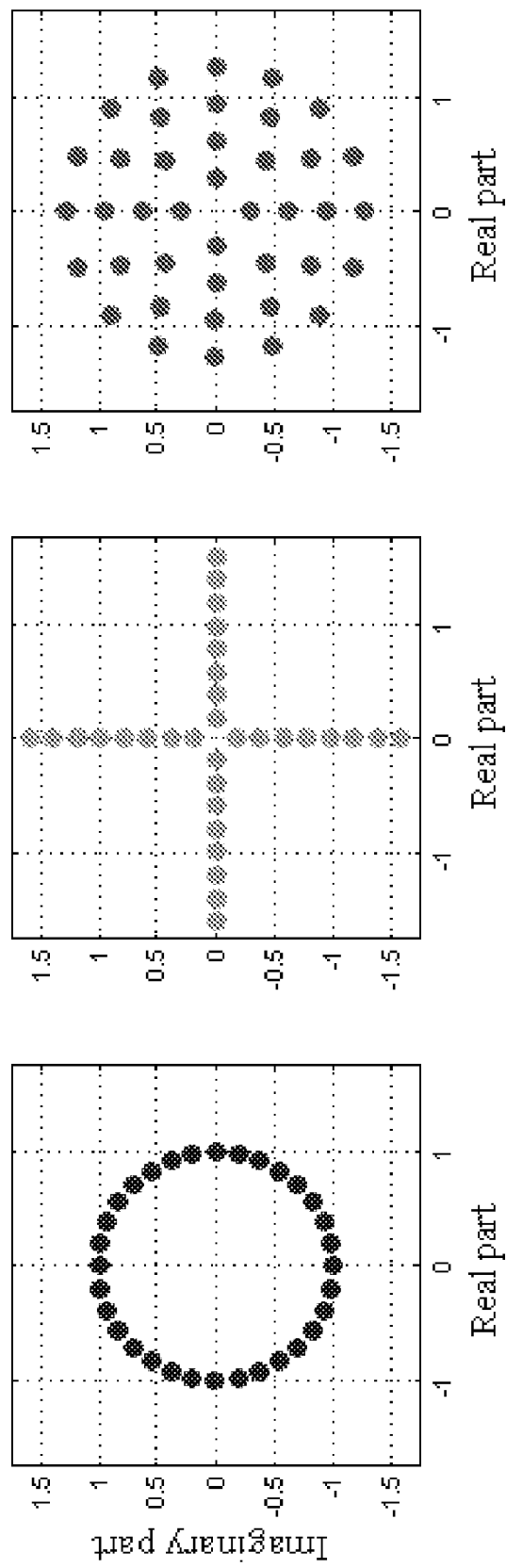
FIGS. 1A through 1C are constellation diagrams for OD32PSK, ODQPSK/PAM8, and a 40-state ODVMPSK/PAM4 signal modulation format, respectively, wherein signal average power is normalized to unity.

FIGS. 1A and 1B show constellation diagrams for two exemplary optical differential multi-level phase-shift keying (ODMPSK) modulation formats, namely, OD32PSK (i.e., 32 level ODMPSK), and ODQPSK/PAM8 (i.e., four level ODMPSK with eight level Pulse Amplitude Modulation), respectively. Each signal modulation format has 32 possible states or symbols. The 32 symbols can represent five bits of information. The signal average power is normalized to unity. As is known, such constellation diagrams are representations of digital optical modulation scheme(s) in a complex plane. By convention, the real and imaginary axes are commonly referred to as the in-phase, or I-axis, and the quadrature, or Q-axis, respectively.

FIG. 1C shows the constellation diagram for an exemplary 40-state Optical Differential Varied-Multilevel Phase-Shift Keying modulation format with four-level Pulse Amplitude Modulation ODVMPSK/PAM4, in accordance with the present invention. The symbol locations of the 40-state ODVMPSK/PAM4 format are as follows:

first amplitude level: $a_1 \cdot [1, j, -1, -j]$;

second amplitude level: $a_2 \cdot \left[1, e^{j\frac{\pi}{4}}, e^{j\frac{\pi}{2}}, e^{j\frac{3\pi}{4}}, e^{j\pi}, e^{j\frac{5\pi}{4}}, e^{j\frac{3\pi}{2}}, e^{j\frac{7\pi}{4}}\right]$;

third amplitude level: $a_3 \cdot [1, e^{j\frac{\pi}{6}}, e^{j\frac{\pi}{3}}, e^{j\frac{\pi}{2}},$ $e^{j\frac{2\pi}{3}}, e^{j\frac{5\pi}{6}}, e^{j\pi}, e^{j\frac{7\pi}{6}}, e^{j\frac{4\pi}{3}}, e^{j\frac{3\pi}{2}}, e^{j\frac{5\pi}{3}}, e^{j\frac{11\pi}{6}}]$; and fourth amplitude level: $a_4 \cdot [1, e^{j\frac{\pi}{8}}, e^{j\frac{\pi}{4}}, e^{j\frac{3\pi}{8}}, e^{j\frac{\pi}{2}}, e^{j\frac{5\pi}{8}}, e^{j\frac{3\pi}{4}},$ $e^{j\frac{7\pi}{8}}, e^{j\pi}, e^{j\frac{9\pi}{8}}, e^{j\frac{5\pi}{4}}, e^{j\frac{11\pi}{8}}, e^{j\frac{3\pi}{2}}, e^{j\frac{13\pi}{8}}, e^{j\frac{7\pi}{4}}, e^{j\frac{15\pi}{8}}]$, where $[a_1, a_2, a_3, a_4]$ are the magnitudes of the amplitude levels of the PAM.

The preferred relative amplitudes for a PAM-m format are approximately:

$$C \cdot (0.9 + [0, 1, 2, \ldots m]), \tag{1}$$

where C is a normalizing factor and m is the number of amplitude levels of the PAM. As used in the present context, the term "amplitude" is intended to refer to the amplitude in the optical field domain, which is the square root of optical intensity. In an exemplary embodiment, the value of 0.9C for the lowest amplitude level is determined by minimizing the bit-error rate (BER) of the signal assuming a random Gaussian noise in the optical field.

In the exemplary 40-state ODVMPSK/PAM format, the numbers of phase states in the $a_1$, $a_2$, $a_3$, and $a_4$ amplitude levels are 4, 8, 12, and 16, respectively. As can be seen, the number of phase states in each amplitude level is proportional to the magnitude of the amplitude, i.e., the larger the amplitude, the larger the number of phase states for that amplitude level.

In an exemplary embodiment, an ODVMPSK/PAM signal has m amplitude levels and the number of phase states at each amplitude level is as follows:

$$P(i) = 4 \cdot i, \text{ where } i = 1, 2, 3 \ldots m \tag{2}$$

The number of symbol states N is:

$$N = \sum_{i=1}^{m} P(i) = \sum_{i=1}^{m} 4 \cdot i = 2m(m+1). \tag{3}$$

In the presence of optical noise, the actual location of each symbol in the signal constellation diagram is time-varying and deviates from its original location with a same standard deviation determined by the strength of the noise field. For differential detection receivers, the separation among the phase differences between any two symbols that are compared with each other at the receiver impacts the receiver performance: the larger the separation in the differential phase, the better the receiver performance. Assuming that at a given time instant the two comparing symbols are both at the i-th amplitude level with p(i, t) possible phase states, the following phase quality factor, $Q_\phi(t)$, can be used to indicate the receiver performance for all the possible symbol combinations:

$$Q_\phi(i, i, t) = \frac{\pi}{p(i, t) \cdot \sigma}, \tag{4}$$

where σ is the standard deviation of the noise field. Note that the number of phase states of each of the different amplitude levels is selected such that the signal constellation is optimized for the best overall performance of the signal, as discussed above.

Assuming that at a given time instant, the first comparing (preceding) symbol is at the j-th amplitude level a(j, t) with p(j, t) possible phase states, and the second comparing (current) symbol is at the i-th amplitude level a(i, t) with p(i, t) possible phase states, the following phase quality factor, $Q_\phi(t)$, can be used to indicate the receiver performance for all the possible symbol combinations:

$$Q_\phi(j, i, t) = \frac{\pi}{p(i, t) \cdot \max\left[\sigma, \sigma \cdot \frac{a(i, t)}{a(j, t)}\right]}. \tag{5}$$

Comparing Equations 4 and 5, it can be understood that when the preceding symbol has a smaller amplitude than the current symbol, the receiver performance is worse than that otherwise. Therefore, it may be beneficial to exclude some choices of the phase states for a given symbol depending on the amplitude level of the preceding symbol in order to have high sensitivity of the differential detection of the ODVMPSK/PAM signal. When the amplitude of a current symbol is larger than that of its preceding symbol, the number of the allowed phase states of the current symbol equals that of its preceding symbol. Thus, the effective number of symbol states $N_{eff}$ of an ODVMPSK/PAM signal may be smaller than its total number of symbol states, N. Thus, the effective number of allowed phase states at each amplitude level is:

$$n_{eff}(i) = \frac{p(i)}{N} \cdot \left[\sum_{j=1}^{i-1} \frac{p(j)^2}{p(i)} + \sum_{j=i}^{m} p(j)\right], \tag{6}$$

where the first summation represents the number of allowed phase states of the preceding symbol whose amplitude is smaller than the current symbol, and the second summation represents the number of allowed phase states of the preceding symbol whose amplitude is not smaller than the current symbol. The effective number of states $N_{eff}$ can then be expressed as follows:

$$N_{eff} = \frac{1}{N} \sum_{i=1}^{m} \left\{p(i) \cdot \left[\sum_{j=1}^{i-1} \frac{p(j)^2}{p(i)} + \sum_{j=i}^{m} p(j)\right]\right\}. \tag{7}$$

For the 40-state ODVMPSK/PAM format shown in FIG. 1C, the effective number of states is 34, which corresponds to an effective number of bits per symbol (bps) of 5.09.

By comparing the minimum distances among the symbols for the three modulation formats, it is expected that the receiver sensitivity of the 40-state ODVMPSK/PAM4 format (FIG. 1C) can be approximately 5 dB better than those of the OD32PSK (FIG. 1A) and the ODQPSK/PAM4 (FIG. 1B) formats. The extra number of states provided by the 40-state ODVMPSK/PAM4 format over the 32-state OD32PSK and the ODQPSK/PAM4 formats can be used to enable strong forward error correction (FEC), which requires certain overhead; to enable better receiver performance, as described above; or to perform coded modulation that improves transmission performance.

Figure 2:
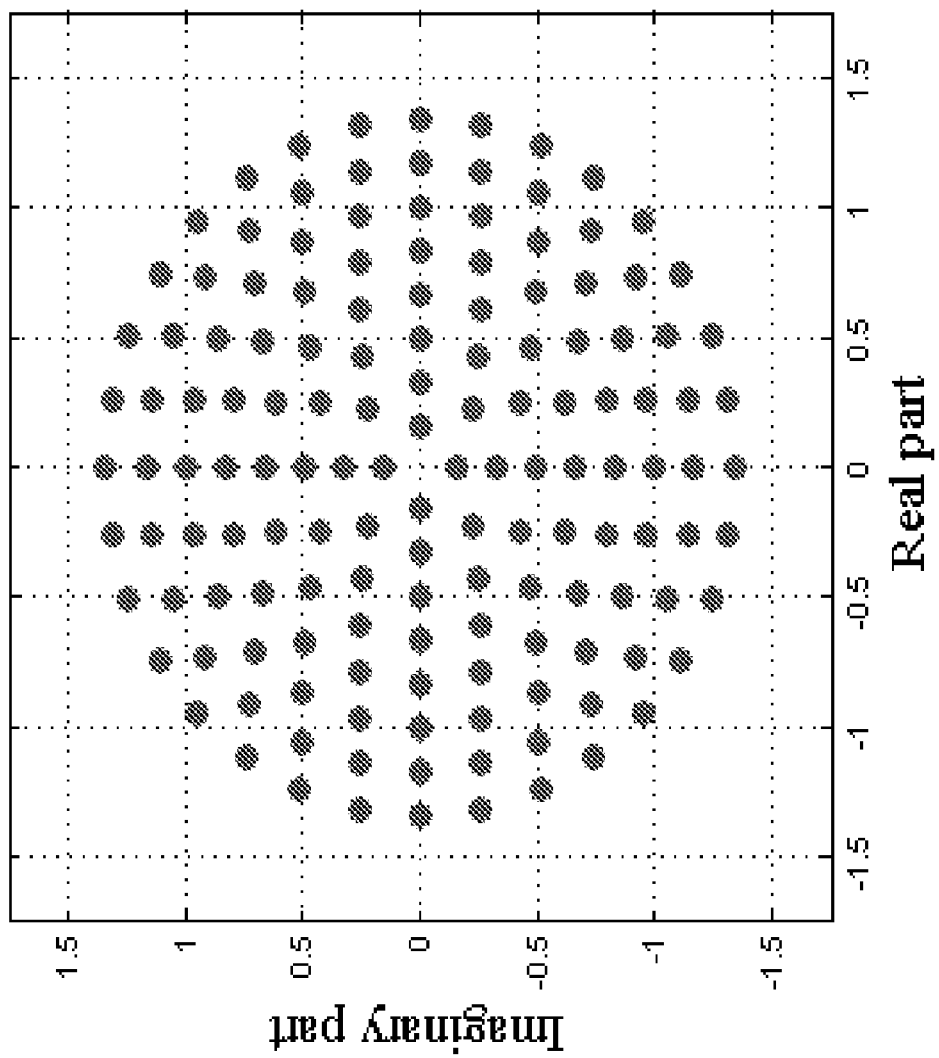
FIG. 2 is a constellation diagram of a 144-state ODVMPSK/PAM8 signal modulation format, in accordance with the present invention, wherein signal average power is normalized to unity.

ODVMPSK/PAM can carry even more bits per symbol. FIG. 2 shows the constellation diagram of a 144-state ODVMPSK/PAM8 modulation format, in accordance with the present invention. According to Equation 7, the effective number of states of this format can be 120, which corresponds to approximately 7 bps, effectively.

Note that the more the bits per symbol, the more the receiver sensitivity advantage the ODVMPSK/PAM format can have over the conventional ODMPSK and ODMPSK/PAM formats. At 7 bps, the ODVMPSK/PAM8 format can outperform OD128PSK and DQPSK/PAM32 by ~12 dB and ~10 dB, respectively, in terms of receiver sensitivity.

In the ODMVPSK/PAM format shown in FIG. 2, there are 8 amplitude levels with relative magnitudes C·[0.9, 1.9, 2.9, 3.9, 4.9, 5.9, 6.9, 7.9], where C is a normalizing factor. The numbers of the phase levels for the amplitude levels are [4, 8, 12, 16, 20, 24, 28, 32], respectively. In the exemplary modulation format illustrated, the number of phase states in each amplitude level increases as the magnitude of the amplitude level increases, i.e., the larger the amplitude, the larger the number of phase states arranged for that amplitude level. The number of phase states in each amplitude level, however, need not be exactly proportional to the amplitude level magnitude. For example, in an ODVMPSK/PAM8 format, the numbers of phase states at the 8 amplitude levels can be 4, 4, 8, 8, 16, 16, 16, and 16, resulting in an 88-state modulation format. As can be appreciated by those skilled in the art, such an 88-state ODVMPSK/PAM8 format offers a lower spectral efficiency than the 140-state ODVMPSK/PAM8 format described above. The 88-state ODVMPSK/PAM8 format, however, may have a higher immunity to linear and nonlinear phase noise than the 140-state ODVMPSK/PAM8 format. With polarization multiplexing, signals having over 8 bits/symbol can be realized with reasonable receiver sensitivities.

Figure 3:
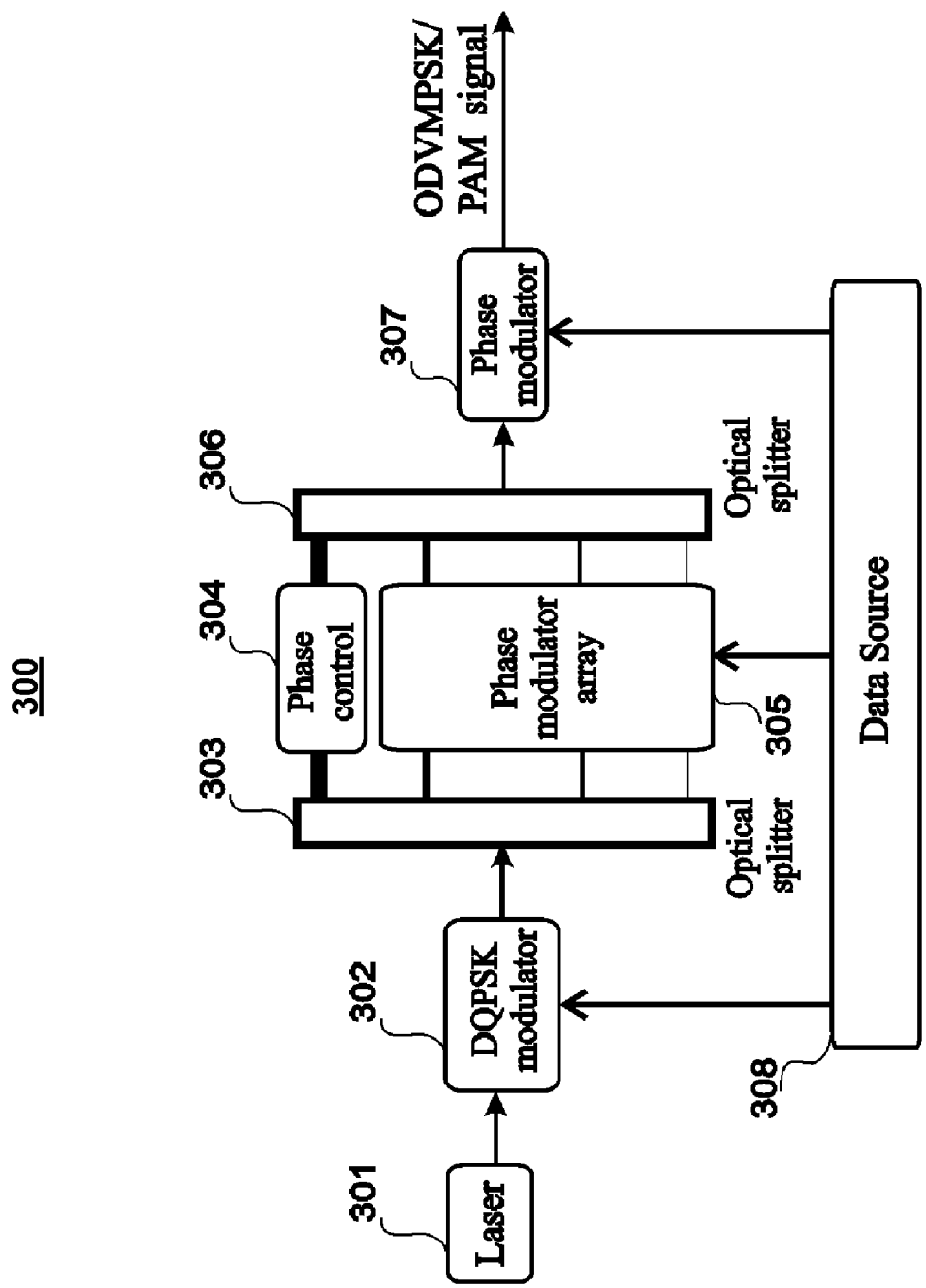
FIG. 3 is a block diagram of an exemplary embodiment of a modulator apparatus for modulating ODVMPSK/PAM signals, in accordance with the present invention.

With reference to FIG. 3, there is shown a block diagram of an exemplary embodiment of an ODVMPSK/PAM transmitter 300 in accordance with the present invention. In the transmitter 300, the output of a laser 301 is provided to an optical DQPSK Modulator 302 whose output is split by an optical splitter 303. The power splitter 303 includes $\log_2(m)+1$ output arms, where m is the number of amplitude levels of the PAM. As described in U.S. Pat. No. 7,558,487, issued on Jul. 7, 2009 and entitled "Multilevel Amplitude And Phase Encoded Signal Generation," incorporated herein by reference in its entirety, the desired relative split power distributions are (0.4+m/2), (m/4), (m/8), . . . , (1), and (1/2), respectively.

The first output of the splitter 303, with a relative power of (0.4+m/2), is provided to a phase control unit 304 but is not modulated by any data, while the remaining split signal outputs are modulated by those data tributaries associated with the PAM. A phase modulator array 305 modulates the split signals in accordance with the $\log_2(m)$ data tributaries associated with the PAM modulation. The data tributaries are provided by a data source 308.

In an exemplary embodiment, the phase modulator array 305 may include an array of Mach-Zehnder Modulators, all biased at null, to act as phase modulators to produce either a "0" or a "π" phase shift on each of the $\log_2(m)$ split signals based on the data supplied by the data source 308.

A further optical splitter 306 combines all the modulated split signals. The splitter 306 is preferably a mirror image of the optical splitter 303, with the identical splitting distribution as optical splitter 303. Because the signal optical power is proportional to the square of the signal optical field amplitude, the cascaded arrangement of the optical splitters 303 and 306, having the same splitting ratios, produces the desired signal power levels. The phase control unit 304 is used to ensure that the optical field of the first split signal is aligned in phase with the modulated split signals. In effect, as can be appreciated, all of the amplitude levels in a m-level PAM constellation, C·(0.9+[0, 1, 2, . . . m]), may be attained by the summation and subtraction among the following $\log_2(m)$ terms, namely: C·(m/4), C·(m/8), . . . , and C·(1/2), added to the averaged term, C·(0.4+m/2). For example, the amplitude levels of an eight-level PAM format, 0.9+[0, 1, 2, 3, 4, 5, 6, 7], can be attained by 4.4±2±1±0.5. More specifically, a first data tributary can be encoded by the most significant modulation arm which provides the (±2) component, a second data tributary can be encoded by the second most significant modulation arm which provides the (±1) component, and the last data tributary can be encoded by the least significant modulation arm which provides the (±0.5) component.

The signal outputted from the optical splitter 306 is effectively an ODQPSK/PAM signal and is provided to an additional phase modulator 307. In effect, the phase modulator 307 appropriately "rotates" the ODQPSK/PAM constellation for each symbol period to generate an ODVMPSK/PAM signal that carries extra phase states (more than four) at high amplitude levels, based on the data provided by the data source 308. For example, a 4-state additional phase modulation with a granularity of π/8 in the range between 0 and 3π/8, together with the DPQSK modulation, will generate 16 total phase states for a given amplitude level of PAM. This can be achieved by driving a single-state phase modulator with a 4-level signal or a multi-stage phase modulator driven by $\log_2(4)$, i.e., two, data tributaries.

As can be appreciated by one of ordinary skill in the art, due to their linear nature, the order in which the DQPSK (block 302), PAM (blocks 303-306), and the additional modulation (block 307) are performed can be varied; i.e., the blocks 302, 303-306, and 307 can be re-ordered from the order in which they are shown in FIG. 3.

In a further exemplary embodiment, the DQPSK modulation (block 302) can be combined with the additional phase modulation (block 307). In such an embodiment, a plurality of nested and cascaded phase modulators can be used to attain all the allowed phase states of the ODVMPSK/PAM signal. Preferably, the phase modulation process satisfies the above-described condition that when the amplitude of a current symbol is larger than that of its preceding symbol, the number of allowed phase states of the current symbol equals that of its preceding symbol.

In an exemplary embodiment, an optical modulator may be used to format the ODVMPSK/PAM signal with return-to-zero (RZ) pulse formatting, which can improve the tolerance of the signal to inter-symbol interference. The RZ pulse formatting may also be done in the electrical domain.

In order to improve immunity to noise, the modulation scheme of the present invention allows the option of not modulating one or more of the least significant data tributaries. The overall data rate of the generated multilevel signal will be reduced, but the signal will be more immune to noise. This provides the flexibility of a data-rate agile transmission, in which the overall signal data-rate can be varied depending on the quality of the transmission link, e.g., the worse the link quality, the lower the data rate, to ensure acceptable transmission performance. Such data-rate agile transmission can be readily realized with the present invention.

To detect an ODVMPSK/PAM signal, the data tributaries associated with the amplitude modulation can be recovered using multi-level intensity detection such as described in K. Sekine et al., "Proposal and demonstration of 10-Gsymbol.sec 16-ary (40 Gb/s) optical modulation/demodulation scheme," ECOC'04, paper We3.4.5. The other data tributaries, which are associated with the differential phase encoding, can be recovered using different techniques. An ODMPSK signal with fixed phase states can be demodulated and detected, for example, by a receiver comprising multiple optical delay interferometers (ODIs), each having a pre-determined phase offset between its two arms, and multiple balanced detectors followed by binary decision circuits, such as described in C. Kim et al., "Direct-detection optical differential 8-level phase-shift keying (OD8PSK) for spectrally efficient transmission," Optics Express, vol. 12, pp. 3415-3421 (2004). The number of ODIs needed in such a receiver equals half of the number of phase states. For example, for OD16PSK, eight ODIs are needed. Such an implementation is complex and expensive.

As an alternative, two ODIs and two balanced detectors followed by multi-level decision circuitry can be used for receiving an ODMPSK signal, but with a compromise in receiver sensitivity. See, e.g., H. Yoon et al., "Performance comparison of optical 8-ary differential phase-shift keying systems with different electrical decision schemes," Optics Express 13, 371-376 (2005).

For an ODVMPSK/PAM signal with the number of phase states being variable and dependent on amplitude, a brute force detection scheme entails replicating the ODIs and balanced detectors to cover the different multilevel cases corresponding to the different amplitudes and select the meaningful data based on the recovered amplitude data.

Figure 4:
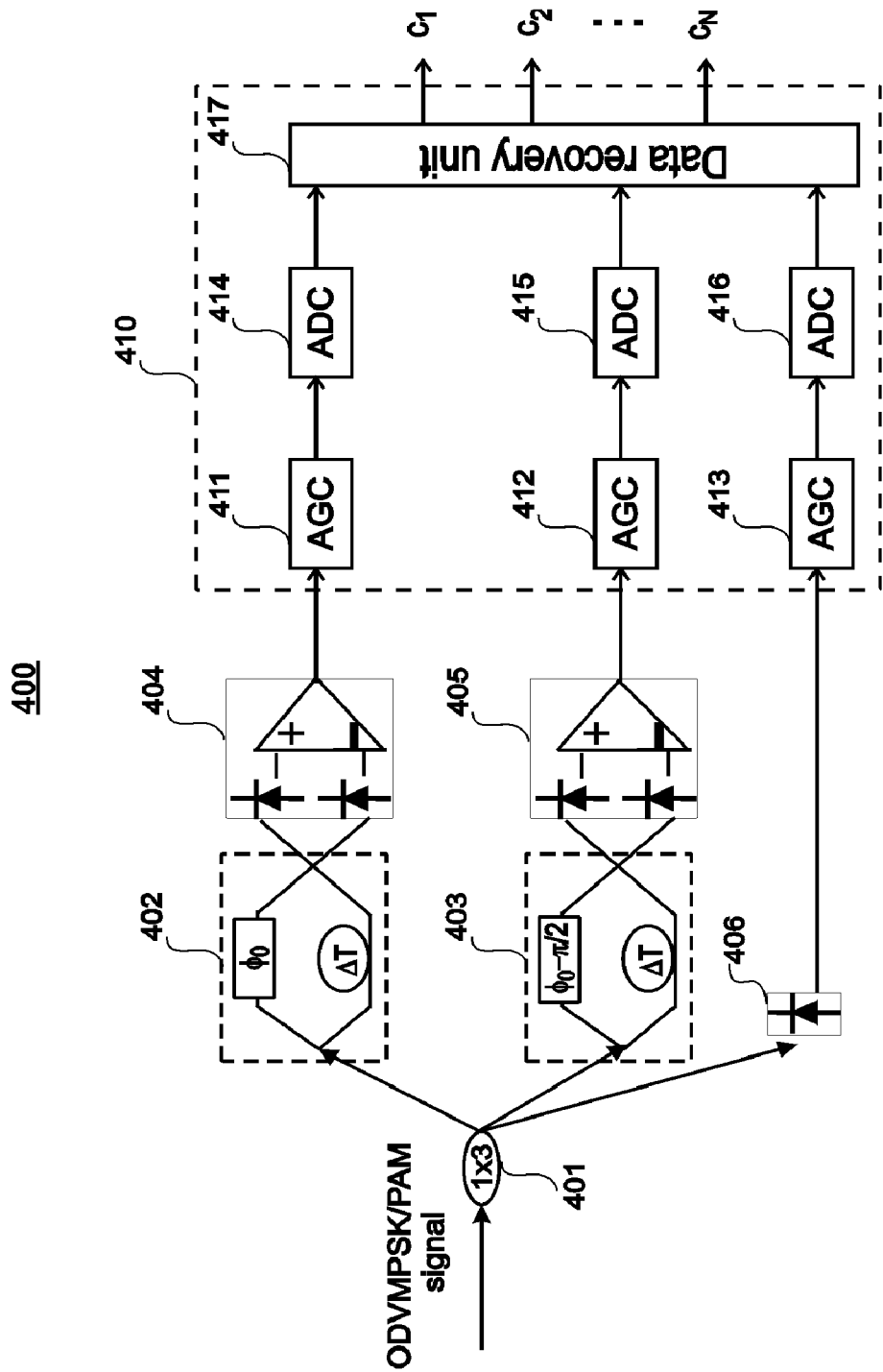
FIG. 4 is a block diagram of an exemplary embodiment of a receiver apparatus for receiving ODVMPSK/PAM signals, in accordance with the present invention.

FIG. 4 shows a block diagram of an exemplary embodiment of a receiver apparatus 400 for receiving ODVMPSK/PAM signals, in accordance with the present invention. The incoming ODVMPSK/PAM signal is separated into three optical paths by a 1×3 coupler 401. The first optical path contains an ODI 402 with a phase offset of $\phi_0$ followed by a balanced detector 404. The second optical path contains an ODI 403 with a phase offset of $\phi_0 - \pi/2$ followed by a balanced detector 405. The delay between the two arms of each of the ODIs 402 and 403 is $\Delta T$, which may be approximately one symbol period.

The third optical path out of the coupler 401 is directed to a photo-detector 406. The signals from detectors 404, 405, and 406 are sent to a "soft decision" block 410. The soft decision block 410 comprises analog-to-digital converters (ADCs) 414, 415, and 416, one for each detected signal. Automatic gain control (AGC) elements 411-413 may optionally be provided before each of the ADCs 414-416, respectively.

The digitized signals output by the ADCs 414-416 are provided to a data recovery unit 417 which computes all necessary decision variables and outputs all N data tributaries contained in the ODVMPSK/PAM signal as $c_1, c_2, \ldots,$ and $c_N$.

The two signals detected by the balanced detectors 404 and 405, denoted here as $u_I$ and $u_Q$, respectively, can be expressed as follows:

$$u_I = Re\{e^{j\phi_0} y(t) \cdot y^*(t-\Delta T)\},$$

$$u_Q = Im\{e^{j\phi_0} y(t) \cdot y^*(t-\Delta T)\}, \quad (8)$$

where y(t) is the normalized signal field entering the receiver, and Re{x} and Im{x} are respectively the real and imaginary parts of complex variable x.

To recover the data tributaries associated with the phase states of an ODMPSK signal, it is desired to obtain multiple decision variables at a given time instant depending on the amplitude levels of the two comparing symbols. For example, an ODVMPSK/PAM signal has m amplitude levels and the highest amplitude level has the maximum number of phase states M=P(m). The maximum number of decision variables needed is M/2, which could be obtained with M ODIs having phase offsets ($\Delta\phi$) of $\pi/M$, $3\pi/M$, and $(2M-1)\pi/M$. As shown below, each one of the M/2 decision variables can be derived from the detected signals $u_I$ and $u_Q$ from only two ODIs. More specifically, the decision variable associated with an ODI with a given phase offset of $\Delta\phi$ is:

$$v(\Delta\phi) = Re\{e^{j\Delta\phi} y(t) \cdot y^*(t-\Delta T)\}, \quad (9)$$

which can be expressed as a function of the detected signals $u_I$ and $u_Q$ as:

$$v(\Delta\phi) = Re\{e^{j(\Delta\phi-\phi_0)} \cdot e^{j\phi_0} y(t) \cdot y^*(t-\Delta T)\} \quad (10)$$
$$= \cos(\Delta\phi - \phi_0) \cdot u_I - \sin(\Delta\phi - \phi_0) \cdot u_Q$$

When $M=2^n$ (where n is an integer that is larger than 2), the M/2 decision variables can then be used to recover n data tributaries associated with the phase states as follows:

$$c_1 = (u_I > 0), \quad (11)$$
$$c_Q = (u_Q > 0),$$
$$c_3 = \left[dv\left(\frac{\pi}{M} + \frac{\pi}{4}\right) > 0\right] \oplus \left[dv\left(\frac{\pi}{M} - \frac{\pi}{4}\right) > 0\right],$$
$$c_4 = \left[dv\left(\frac{\pi}{M} + \frac{\pi}{8}\right) > 0\right] \oplus \left[dv\left(\frac{\pi}{M} - \frac{3\pi}{8}\right) > 0\right] \oplus$$
$$\left[dv\left(\frac{\pi}{M} + \frac{3\pi}{8}\right) > 0\right] \oplus \left[dv\left(\frac{\pi}{M} - \frac{\pi}{8}\right) > 0\right],$$
$$\ldots$$
$$c_n = \left[dv\left(\frac{\pi}{M} + \frac{2}{M}\pi\right) > 0\right] \oplus \left[dv\left(\frac{\pi}{M} + \frac{2+4}{M}\pi\right) > 0\right] \oplus \ldots$$
$$\left[dv\left(\frac{\pi}{M} + \frac{M/2-2}{M}\pi\right) > 0\right] \oplus$$
$$\left[dv\left(\frac{\pi}{M} + \frac{2}{M}\pi - \frac{\pi}{2}\right) > 0\right] \oplus$$
$$\left[dv\left(\frac{\pi}{M} + \frac{2+4}{M}\pi - \frac{\pi}{2}\right) > 0\right] \oplus \ldots$$
$$\left[dv\left(\frac{\pi}{M} + \frac{M/2-2}{M}\pi - \frac{\pi}{2}\right) > 0\right],$$

where $\oplus$ denotes an exclusive or (XOR) logic operation.

Note that an appropriate pre-coding of the original data tributaries before optical modulation at the transmitter can be used to ensure that the decoded data tributaries are the original ones. The pre-coding function can be determined based on the optical modulation scheme and the optical demodulation and decoding schemes used.

In the detection of ODVMPSK/PAM, the decision variables at a given time are dependent on the intensity levels I(n)

and I(n−1) of the current symbol and the previous symbol, respectively. Using I(n) and I(n−1), as provided by the detector 406, the data recovery unit 417 can compute the needed decision variables associated with the phase modulation in accordance with Equations 8-10. In effect, the original data tributaries associated with the phase modulation are recovered based on a symbol-by-symbol intensity-dependent derivation of decision variables. Note that the decision variables associated with the PAM can be straightforwardly obtained by using the signal intensity profile I(t) measured from the photo-detector 406. Finally, data content is extracted either directly from the decision variables or after further decoding (if coded modulation is applied at the transmitter).

In an exemplary embodiment, the data recovery unit 417 can be implemented using digital signal processing (DSP) which can be implemented, for example, in an application specific integrated circuit (ASIC) or a field-programmable gate array (FPGA).

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of generating amplitude and differential-phase encoded optical signals comprising the steps of:
   amplitude-modulating an optical carrier to produce an amplitude-modulated optical signal having a plurality of amplitude levels; and
   phase-modulating the amplitude-modulated optical signal to produce an optical differential varied-multilevel phase-shift keying with pulse amplitude modulation (ODVMPSK/PAM) signal in which the number of phase states at a given amplitude level of the plurality of amplitude levels is less than or equal to the number of phase states at a higher amplitude level of the plurality of amplitude levels and at least two of the plurality of amplitude levels have different numbers of phase states.

2. The method of claim 1, comprising phase-modulating the optical carrier using differential quadrature phase shift keying (DQPSK) before the amplitude-modulating step.

3. The method of claim 1, wherein the phase-modulating step includes phase-modulating the amplitude-modulated optical signal depending on an amplitude level of a current symbol and an amplitude level of a preceding symbol.

4. The method of claim 1, wherein the number of allowed phase states of a current symbol equals that of a preceding symbol when an amplitude of the current symbol is larger than an amplitude of the preceding symbol.

5. The method of claim 1, wherein the phase-modulating step is synchronized to the amplitude-modulating step.

6. The method of claim 1, wherein the amplitude-modulating step includes:
   splitting the optical carrier into a number of optical signals, wherein each one of the number of optical signals has a different optical power;
   phase-modulating at least one of the number of optical signals; and
   combining the phase-modulated optical signals.

7. The method of claim 6, wherein the optical carrier is split into $\log_2(m)+1$ optical signals having a respective power splitting distribution of $(0.4+m/2), (m/4), (m/8), \ldots, (1)$, and $(1/2)$, wherein m is the number of amplitude levels.

8. The method of claim 6, wherein the amplitude-modulating step includes aligning the phase-modulated optical signals before they are combined.

9. The method of claim 6, wherein the step of phase-modulating the at least one of the number of optical signals is performed in accordance with a data tributary.

10. The method of claim 9, wherein a phase of the at least one of the number of optical signals is modulated by an amount approximately equal to $\pi$.

11. The method of claim 1, wherein the number of phase states at each of the plurality of amplitude levels is approximately proportional to a magnitude of an amplitude of each of the plurality of amplitude levels.

12. The method of claim 11, wherein the number of phase states at each of the plurality of amplitude levels is approximately four times an order of each of the plurality of amplitude levels.

13. The method of claim 1 wherein the ODVMPSK/PAM signal is formatted with return-to-zero pulse formatting.

14. A method of generating amplitude and differential-phase encoded optical signals comprising the steps of:
   phase-modulating an optical carrier to produce a phase-modulated optical signal; and
   amplitude-modulating the phase-modulated optical signal with a plurality of amplitude levels to produce an optical differential varied-multilevel phase-shift keying with pulse amplitude modulation (ODVMPSK/PAM) signal in which the number of phase states at a given amplitude level of the plurality of amplitude levels is less than or equal to the number of phase states at a higher amplitude level of the plurality of amplitude levels and at least two of the plurality of amplitude levels have different numbers of phase states.

15. The method of claim 14, wherein the phase-modulating step includes phase-modulating the optical carrier using differential quadrature phase shift keying (DQPSK).

16. An apparatus for generating amplitude and differential-phase encoded optical signals comprising:
   an amplitude modulator, the amplitude modulator amplitude-modulating an optical carrier to produce an amplitude-modulated optical signal having a plurality of amplitude levels; and
   a phase modulator, the phase modulator phase-modulating the amplitude-modulated optical signal to produce an optical differential varied-multilevel phase-shift keying with pulse amplitude modulation (ODVMPSK/PAM) signal in which the number of phase states at a given amplitude level of the plurality of amplitude levels is less than or equal to the number of phase states at a higher amplitude level of the plurality of amplitude levels and at least two of the plurality of amplitude levels have different numbers of phase states.

17. The apparatus of claim 16, comprising a differential quadrature phase shift keying (DQPSK) modulator for modulating the optical carrier before it is amplitude-modulated.

18. The apparatus of claim 16, wherein the phase modulator phase-modulates the amplitude-modulated optical signal depending on an amplitude level of a current symbol and an amplitude level of a preceding symbol.

19. The apparatus of claim 16, wherein the number of allowed phase states of a current symbol equals that of a preceding symbol when an amplitude of the current symbol is larger than an amplitude of the preceding symbol.

20. The apparatus of claim 16, wherein the amplitude modulator includes:
   a splitter for splitting the optical carrier into a number of optical signals, wherein each one of the number of optical signals has a different optical power;
   a further phase modulator for phase-modulating at least one of the number of optical signals; and a combiner for combining the phase-modulated optical signals.

21. The apparatus of claim 20, wherein the further phase modulator includes a Mach-Zehnder modulator biased at null.

22. The apparatus of claim 20, wherein the optical carrier is split into $\log_2(m)+1$ optical signals having a respective power splitting distribution of $(0.4+m/2)$, $(m/4)$, $(m/8)$, ..., $(1)$, and $(1/2)$, wherein m is the number of amplitude levels.

23. The apparatus of claim 20, wherein the further phase modulator phase-modulates the at least one of the number of optical signals in accordance with a data tributary.

24. The apparatus of claim 23, wherein a phase of the at least one of the number of optical signals is modulated by an amount approximately equal to $\pi$.

25. The apparatus of claim 20, wherein the amplitude modulator includes a phase controller for aligning the phase-modulated optical signals before they are combined.

26. The apparatus of claim 16, wherein the number of phase states at each of the plurality of amplitude levels is approximately proportional to a magnitude of an amplitude of each of the plurality of amplitude levels.

27. The apparatus of claim 26, wherein the number of phase states at each of the plurality of amplitude levels is approximately four times an order of each of the plurality of amplitude levels.

28. The apparatus of claim 16, wherein the ODVMPSK/PAM signal is formatted with return-to-zero pulse formatting.

29. An apparatus for generating multilevel amplitude and phase encoded optical signals comprising:
   a phase modulator, the phase modulator phase-modulating an optical carrier to produce a phase-modulated optical signal; and
   an amplitude modulator, the amplitude modulator amplitude-modulating the phase-modulated optical signal with a plurality of amplitude levels to produce an optical differential varied-multilevel phase-shift keying with pulse amplitude modulation (ODVMPSK/PAM) signal in which the number of phase states at a given amplitude level of the plurality of amplitude levels is less than or equal to the number of phase states at a higher amplitude level of the plurality of amplitude levels and at least two of the plurality of amplitude levels have different numbers of phase states.

30. The apparatus of claim 29, wherein the phase modulator includes a differential quadrature phase shift keying (DQPSK) modulator.

* * * * *

UNITED STATES PATENT AND TRADEMARK OFFICE
CERTIFICATE OF CORRECTION

PATENT NO. : 7,668,256 B2  Page 1 of 1
APPLICATION NO. : 11/458825
DATED : February 23, 2010
INVENTOR(S) : Giles et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 859 days.

Signed and Sealed this

Twenty-eighth Day of December, 2010

David J. Kappos
*Director of the United States Patent and Trademark Office*